(12) United States Patent
Bennett

(10) Patent No.: US 11,452,076 B2
(45) Date of Patent: Sep. 20, 2022

(54) DEVICE FOR OBTAINING PERMISSION TO USE A RADIO FREQUENCY (RF) RESOURCE

(71) Applicant: NetComm Wireless Pty Ltd, Lane Cove (AU)

(72) Inventor: William Bennett, Lane Cove (AU)

(73) Assignee: Netcomm Wireless Pty Ltd, Lane Cove (AU)

( * ) Notice: Subject to any disclaimer, the term of this patent is extended or adjusted under 35 U.S.C. 154(b) by 96 days.

(21) Appl. No.: 17/117,046

(22) Filed: Dec. 9, 2020

(65) Prior Publication Data

US 2022/0182987 A1   Jun. 9, 2022

(51) Int. Cl.
   *H04W 16/14*   (2009.01)
   *H04W 72/04*   (2009.01)
   *H04W 48/02*   (2009.01)
   *H04W 24/08*   (2009.01)

(52) U.S. Cl.
   CPC .......... *H04W 72/04* (2013.01); *H04W 16/14* (2013.01); *H04W 24/08* (2013.01); *H04W 48/02* (2013.01)

(58) Field of Classification Search
   CPC ..... H04W 72/04; H04W 16/14; H04W 24/08; H04W 48/02
   See application file for complete search history.

(56) References Cited

FOREIGN PATENT DOCUMENTS

CN    103874986 A  *  6/2014  .......... G06F 11/3495

* cited by examiner

*Primary Examiner* — Said M Elnoubi
(74) *Attorney, Agent, or Firm* — Kilpatrick Townsend & Stockton LLP

(57) ABSTRACT

A device obtains permission to use a Radio Frequency (RF) resource to transmit/receive data. The device comprises a transceiver and a processor that: controls the transceiver to communicate with a RF resource allocation system over the RF resource to determine whether the device can use the RF resource; while the transceiver communicates with the RF resource allocation system, repeatedly determines whether a cumulative use of the RF resource satisfies a condition until the processor determines that the cumulative use satisfies the condition or the device is permitted to use the RF resource; upon the processor determining that the cumulative use satisfies the condition, control the transceiver to not communicate with the RF resource allocation system over the RF resource for a period of time; and upon determining that the device is permitted to use the RF resource, controls the device to use the RF resource to transmit/receive the data.

20 Claims, 4 Drawing Sheets

DEVICE FOR OBTAINING PERMISSION TO USE A RADIO FREQUENCY (RF) RESOURCE

FIELD OF THE INVENTION

The invention is related to a device for obtaining permission to use a Radio Frequency (RF) resource to transmit or receive data, and a method of doing the same, and is especially but not exclusively applicable to a device for obtaining permission to use the Citizen's Broadband Radio Service (CBRS) spectrum.

BACKGROUND

RF resources, specifically RF spectrum, is a finite resource. Demand for such RF resources is high for technologies like wireless broadband. Because RF spectrum for wireless broadband is typically shared between multiple users, one user's utilization of the RF spectrum will affect another user's utilization of the same RF spectrum. Access to RF spectrum is mostly controlled and auctioned by governments to licensed providers at generally very expensive prices.

Once a frequency range has been auctioned or allocated, it is difficult to reclaim and use the frequency range for a different purpose, even if sections of the auctioned or allocated frequency range are subsequently used inefficiently or rarely.

Advances in technology have provided alternatives that can improve efficiency and lower costs. One alternative involves using automated systems to allocate RF spectrum in a rapid and dynamic way to individual devices, instead of government officials allocating the RF spectrum on a semi-permanent basis to licensees. The allocations can change over time to meet current needs and to increase the amount of sharing. Typically, the automated systems do not specify or restrict what the RF spectrum must be used for and rely on competition to drive efficiency.

Before a device may use such RF spectrum, the device must usually first query the automated system to obtain authorization or permission to use the RF spectrum. There is a need for an improved method and device for obtaining permission to use a RF resource (in particular, such RF spectrum) to transmit or receive data.

SUMMARY OF THE INVENTION

In a first aspect, the invention provides a device for obtaining permission to use a Radio Frequency (RF) resource to transmit or receive data, the device comprising:
 a transceiver; and
 a processor configured to:
  control the transceiver to communicate with a RF resource allocation system over the RF resource in order to determine whether or not the device is permitted to use the RF resource;
  while the transceiver is communicating with the RF resource allocation system over the RF resource, repeatedly determine whether or not a cumulative use of the RF resource by the device to communicate with the RF resource allocation system satisfies a condition until the processor determines that either (i) the cumulative use of the RF resource satisfies the condition or (ii) the device is permitted to use the RF resource;
  upon the processor determining that the cumulative use of the RF resource satisfies the condition, control the transceiver to not communicate with the RF resource allocation system over the RF resource for a period of time; and
  upon the processor determining that the device is permitted to use the RF resource, control the device to use the RF resource to transmit or receive the data.

As indicated above, the invention involves controlling a device to communicate with a RF resource allocation system over a RF resource in order to determine whether or not the device is permitted to use the RF resource. That is, the invention a device making an access request for the RF spectrum. In an embodiment, access requests may be made with short bursts and so the access requests may be made with very constrained usage of the RF spectrum.

While the device is communicating with the RF resource allocation system over the RF resource, the device repeatedly determines whether or not a cumulative use of the RF resource by the device to communicate with the RF resource allocation system satisfies a condition until the processor determines that either (i) the cumulative use of the RF resource satisfies the condition or (ii) the device is permitted to use the RF resource with constrained usage of a RF spectrum. Thus, an embodiment of the invention involves tallying the total amount of pre-authorization usage of the RF spectrum so that both the total and the duty cycle are kept to small worst-case values. In an embodiment, no additional hardware (to what already is provided by the device) is required.

By repeatedly determining whether or not a cumulative use of a RF resource a device to communicate with a RF resource allocation system satisfies a condition, while the device is communicating with the RF resource allocation system over the RF resource, until there is a determination that either (i) the cumulative use of the RF resource satisfies the condition or (ii) the device is permitted to use the RF resource, the method of obtaining permission to use a RF resource to transmit or receive data can minimize impacts on other users using the same RF resource and complies with regulations.

In an embodiment, the RF resource is an unlicensed Citizen's Broadband Radio Service (CBRS) spectrum, and the RF resource allocation system is a Federal Communications Commission (FCC) Spectrum Access System (SAS) system.

In an embodiment, the device is a $4^{th}$ Generation (4G) Long Term Evolution (LTE) device.

In an embodiment, the processor is configured to control the transceiver to transmit a request to a SAS server.

In an embodiment, the processor is configured to determine that the device is permitted to use the RF resource after receiving a grant approval from a SAS server.

In an embodiment, the processor is configured to:
 determine an expected immediate use of the RF resource;
 calculate an updated cumulative use of the RF resource based on the expected immediate use of the RF resource; and
 compare the updated cumulative use of the RF resource to a threshold to determine whether or not the updated cumulative use exceeds the threshold.

In an embodiment, the processor is configured to determine the expected immediate use of the RF resource based on a type of the expected immediate use of the RF resource.

In an embodiment, the type of the expected immediate use of the RF resource is one or more of a group consisting of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission.

In an embodiment, the processor is configured to:
calculate the updated cumulative use of the RF resource for a period of time; and
determine the threshold based on the period of time for which the updated cumulative use of the RF resource is calculated.

In an embodiment, the processor is configured to:
determine whether or not another RF spectrum is available for use before controlling the transceiver to communicate with the RF resource allocation system over the RF resource; and
controlling the transceiver to communicate with the RF resource allocation system over the RF resource, upon determining that the other RF spectrum is not available for use.

In a second aspect, the invention provides a method of obtaining permission to use a Radio Frequency (RF) resource to transmit or receive data, the method comprising:
controlling a device to communicate with a RF resource allocation system over the RF resource in order to determine whether or not the device is permitted to use the RF resource;
while communicating with the RF resource allocation system over the RF resource, repeatedly determining whether or not a cumulative use of the RF resource by the device to communicate with the RF resource allocation system satisfies a condition until there is a determination that either (i) the cumulative use of the RF resource satisfies the condition or (ii) the device is permitted to use the RF resource;
upon a determination that the cumulative use of the RF resource satisfies the condition, controlling the device to not communicate with the RF resource allocation system over the RF resource for a period of time; and
upon a determination that the device is permitted to use the RF resource, controlling the device to use the RF resource to transmit or receive the data.

In an embodiment, the RF resource is an unlicensed Citizen Broadband Radio Service (CBRS) spectrum, and the RF resource allocation system is a Federal Communications Commission (FCC) Spectrum Access System (SAS) system.

In an embodiment, the device is a $4^{th}$ Generation (4G) Long Term Evolution (LTE) device.

In an embodiment, controlling the device to communicate with the RF resource allocation system over the RF resource comprises controlling the device to transmit a request to a SAS server.

In an embodiment, the method further comprises determining that the device is permitted to use the RF resource after receiving a grant approval from a SAS server.

In an embodiment, determining whether or not the cumulative use of the RF resource satisfies the condition comprises:
determining an expected immediate use of the RF resource;
calculated an updated cumulative use of the RF resource based on the expected immediate use of the RF resource; and
comparing the updated cumulative use of the RF resource to a threshold to determine whether or not the updated cumulative use exceeds the threshold.

In an embodiment, the expected immediate use of the RF resource is determined based on a type of the expected immediate use of the RF resource.

In an embodiment, the type of the expected immediate use of the RF resource is one or more of a group consisting of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission.

In an embodiment, the updated cumulative use of the RF resource is calculated for a period of time, and
determining whether or not the cumulative use of the RF resource satisfies the condition comprises determining the threshold based on the period of time for which the updated cumulative use of the RF resource is calculated.

In an embodiment, the method further comprises:
determining whether or not another RF spectrum is available for use before controlling the device to communicate with the RF resource allocation system over the RF resource; and
controlling the device to communicate with the RF resource allocation system over the RF resource, upon determining that the other RF spectrum is not available for use.

BRIEF DESCRIPTION OF DRAWINGS

In order that the invention may be more clearly ascertained, embodiments will now be described by way of example with reference to the accompanying drawings in which.

DETAILED DESCRIPTION OF EMBODIMENTS OF THE INVENTION

Figure 1:
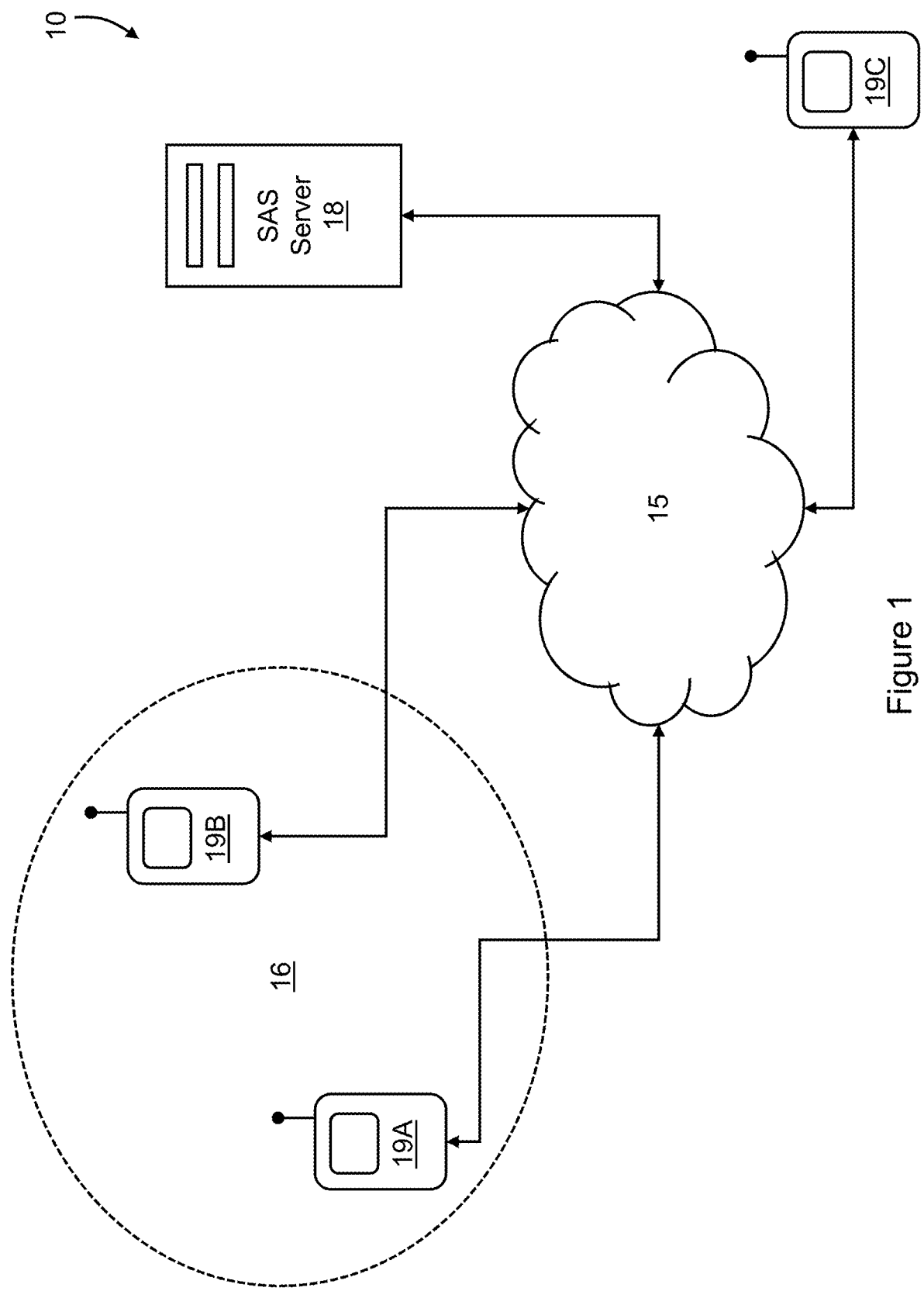
FIG. 1 is a schematic diagram of the physical architecture of a system 10 comprising a plurality of devices 19 for obtaining permission to use a CBRS spectrum to transmit or receive data.

Referring to the drawings, there are illustrated embodiments of a device 19 (for example, a mobile computing device such as a smartphone or a portable computer such as a tablet computer) for obtaining permission to use a Radio Frequency (RF) resource (in particular, an unlicensed spectrum such as the Citizen's Broadband Radio Service (CBRS) frequency spectrum). The device 19 comprises a transceiver 1990 and a processor 1900.

The processor 1900 is configured to control the transceiver 1990 to communicate with a RF resource allocation system (for example, the Federal Communications Commission (FCC) Spectrum Access System (SAS)) 18 over the RF resource in order to determine whether or not the device 19 is permitted to use the RF resource.

While the transceiver 1990 is communicating with the RF resource allocation system over the RF resource, a determination of whether or not a cumulative use of the RF resource by the device 19 (that is, a cumulative use of the RF resource by the device 19 to communicate with the RF resource allocation system 18 to determine whether or not the device 19 is permitted to use the RF resource) satisfies a condition is performed.

This determination is performed repeatedly until either (i) the cumulative use of the RF resource satisfies the condition or (ii) the device 19 is permitted to use the RF resource.

Upon a determination that the cumulative use of the RF resource satisfies the condition, the transceiver 1990 is controlled to not communicate with the RF resource allocation system 18 over the RF resource for a period of time. For example, the device 19 may hold off or pause on communicating with the RF resource allocation system 18 for a period of time, before resuming communicating with the RF resource allocation system 18 over the RF resource in order to continue determining whether or not the device 19 is permitted to use the RF resource. Upon a determination that the device 19 is permitted to use the RF resource, the device 19 is controlled to use the RF resource to transmit or receive the data.

The Citizen's Broadband Radio Service known as CBRS takes much of its name and history from the old CB radio of the 1970's in the United States. The intent was to develop a plan to best share unused and under-utilized unlicensed spectrum. The 3.5 GHz CBRS band consists of 150 MHz of spectrum spanning 3550-3700 MHz which was previously allocated to the US Navy and few fixed satellite services. Both uses are quite rare in a large area of the US (especially inland) and even when used tend to be only for short periods (e.g. when ships are close to shore or during special events). This is specified in 47 CFR Part 96.

Allocations are issued based on geographic service area (census tracts—usually follow city/county borders) and will be coordinated on a dynamic/automatic basis by the FCC SAS which is a networked database for receiving applications for licensing and for issuing permits. Licenses are issued on a 3-tiered system with different costs and interference rules, by a 3rd party operated system that is approved by the FCC. SAS administrators coordinate frequency allocation and charge a fee to users. It acts as the first line of recourse for dealing with issues, however the ultimate enforcement is still the FCC. Protocol is based on Internet Engineering Task Force (IETF) Protocol to Access White Spaces (PAWS) Request for Comments (RFC) 7545

The devices requesting access are called Citizens Broadband Radio Service Device (CBSD), and the permitting device is called an SAS Server. Approved devices can contact a SAS server using existing Internet infrastructure and ask for permission to use a certain portion of that spectrum.

Since a SAS server already knows where the device in question is physically located and the geography between that device and other users in the area, it is able to calculate whether the new device would cause interference. If the interference is below a threshold then it gives the new device a "grant" and the device can make use of the spectrum, with the condition that it regularly checks with the SAS server to make sure the situation hasn't changed. In general, the device has to be prepared to stop using the CBRS spectrum within a couple of minutes if it cannot confirm that access is still granted.

In addition, the FCC granted a special exception for devices which are designed to use the RF link to provide a connection the Internet. i.e. those devices which are not able to ask for permission to use the spectrum without using the spectrum. They are allowed to transmit solely for the purpose of getting a grant but are subjected to strict limits on how long they are allowed to transmit for, as specified in the FCC Knowledge Database (KDB) 940660 D02 CBSD Frequency Asked Questions (FAQ) v01.

FIG. 1 is a schematic diagram of the physical architecture of a system 10 comprising a plurality of such devices 19. In this embodiment, each device 19 is configured to obtain permission to use a RF resource in the form of the CBRS spectrum. It is envisaged that an alternative embodiment of the device 19 may be configured to obtained permission of a RF resource other than the CBRS spectrum. Each device 19 of FIG. 1 is configured to not only use the CBRS spectrum but also another RF resource in the form of a $4^{th}$ Generation (4G) Long Term Evolution (LTE) spectrum. It is envisaged the device 19 of an alternative embodiment may be configured to use another RF spectrum other than a 4G LTE spectrum or at all.

As illustrated in FIG. 1, each device 19 may be able to communicate with a RF resource allocation system in the form of the FCC SAS comprising a SAS server 18 which each device 19 may make a request via the Internet 15 to obtain permission to use the CBRS spectrum. In this embodiment, two of the devices 19A, 19B are located in a region 16 where there is CBRS coverage but no 4G LTE coverage, and so must use the CBRS spectrum to obtain permission or authorization to use the CBRS spectrum from the FCC SAS. As described in further detail below, each of the devices 19 of FIG. 1 (whether located in the region 16 or not) can do so, that is, configured to use the CBRS spectrum in order to seek or obtain permission or authorization to use the same CBRS spectrum to transmit or receive data. However, it is envisaged that an embodiment of the device 19 may be part of a system 10 that includes devices 19 that are not configured to use the CBRS spectrum to obtain permission or authorization to use the CBRS spectrum from the FCC SAS.

Figure 2:
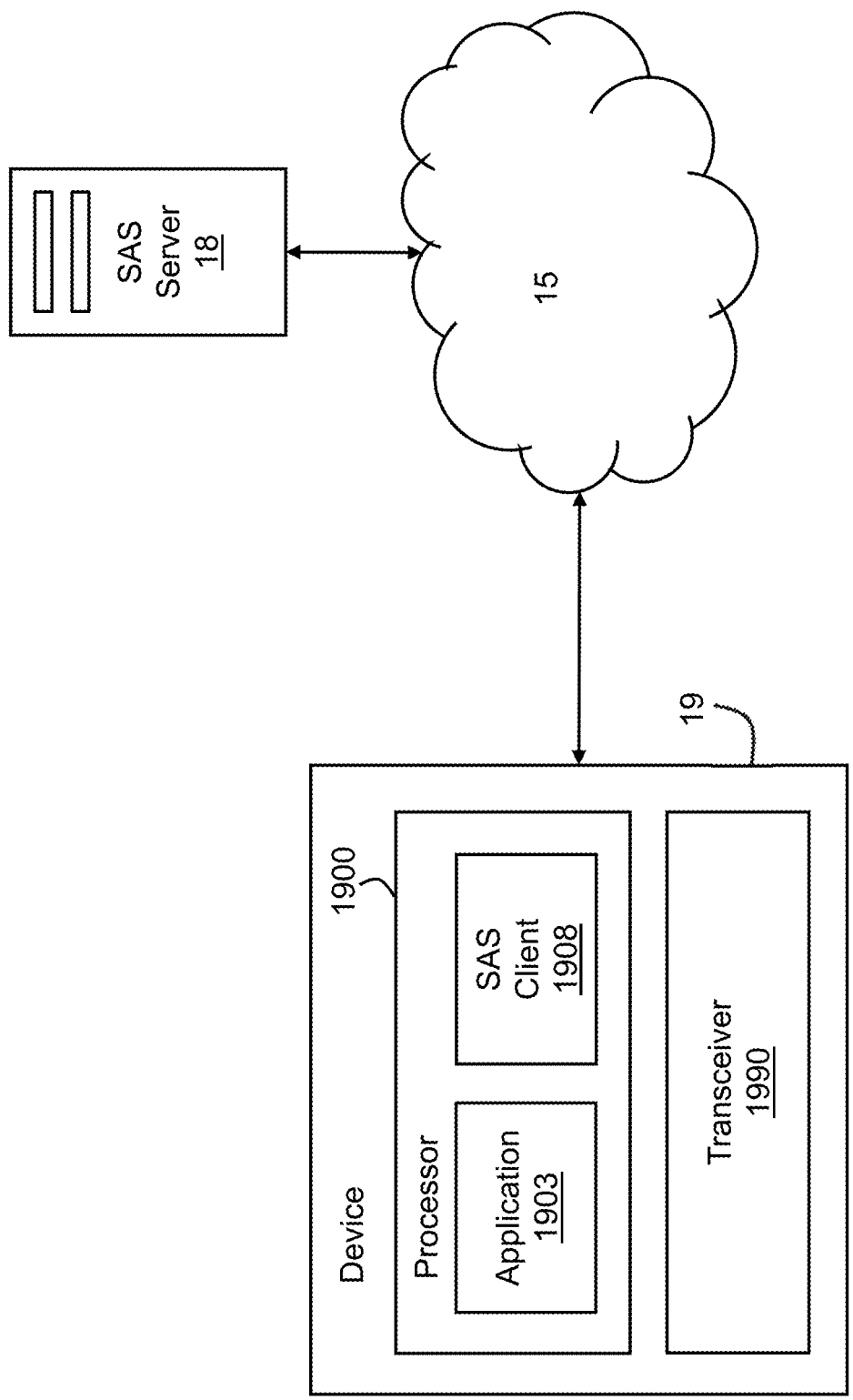
FIG. 2 is a schematic diagram showing more specific components of each device 19 of FIG. 1.

FIG. 2 is a schematic diagram showing more specific components of each device 19 of FIG. 1. As illustrated in FIG. 2, the device 19 is configured to implement a number of functional components. It is envisaged that the functional components are typically implemented by a processor executing program code and data stored in a memory. However, persons skilled in the art will appreciate that this need not be the case. For example, one or more of the components could be implemented in an alternative manner, for example, as a dedicated circuit that is part of or in communication with the device 19.

The device 19 comprises a transceiver 1990 and a processor 1900. A person skilled in the art will appreciate that the device 19 may include other components such as a display etc. In this embodiment, the transceiver 1990 comprises RF equipment, modem, or both. However, it is envisaged that the transceiver 1990 of an alternative embodiment may include alternative or additional components such as one or more components for other RF communication (such as $5^{th}$ Generation (5G) New Radio (NR)) or even non-RF communication.

The processor 1900 is configured to execute program code and data stored in a memory of the device 19 in order to implement the above-mentioned functional components to enable the device 19 to obtain permission to use the CBRS spectrum to transmit or receive data. As described in further detail below, each functional component may in turn generate additional program code and additional data for storage in a memory such that the processor 1900 can additionally execute the additional program code and the additional data in order to implement additional functional components.

In this embodiment, the functional components implemented by the processor 1900 comprise a designated application 1903 and a SAS client 1908. A person skilled in the art will appreciate that alternative embodiment of the device 19 may involve the processor 1900 implementing less or more functional components. For example, the functionalities of the designated application 1903 and the SAS client 1908 may combined into one functional component. Also, it is envisaged that a functional component may comprise sub-components.

The designated application 1903 is implemented by the processor 1900, upon download or otherwise transmission of program code and data corresponding to the application from another device to the device 19. It is envisaged that the corresponding program code and data may need to be installed before the device 19 can implement the application 1903.

Upon installation, the application 1903 can be boot or start up to enable the device 19 to initiate the process to use the CBRS spectrum to obtain permission to use the same CBRS spectrum to transmit or receive data. More specifically, the application 1903 is configured to, upon boot-up, transmit a request to the SAS client 1908 in order to make a determination of whether or not the device 19 is required to obtain authorization for using the CBRS spectrum to transmit data. If the device 19 has such an authorization or permission to use the CBRS spectrum, a user of the device 19 can then use the application 1903 to transmit and receive the data using the CBRS spectrum. For example, if the device 19 has previously received a grant approval from the SAS server 18, a user can use the application 1903 to control the transceiver 1990 to transmit data to an application server which is connected via the Internet. The application 1903 can also be used to display any data received over the CBRS spectrum such as data from the Internet. In this embodiment, the authorization or permission to use the CBRS spectrum is temporary. Accordingly, the application 1903 is also configured to pause or stop the device 19 from using the CBRS spectrum, when the device 19 is no longer authorized or permitted to use the CBRS spectrum, for example, when the authorization or permission has expired.

Like with the designated application 1903, the SAS client 1908 of this embodiment of the device 19 is implemented by the processor 1900, upon download and/or installation of program code and data. It is envisaged the SAS client 1908 and the designated application 1903 may be implemented by separate program code, separate data, or both separate program code and separate data depending on implementation of the embodiment of the device 19.

The SAS client 1908 is configured to determine whether or not the device 19 is required to obtain authorization for using the CBRS spectrum. In this embodiment, the SAS client 1908 first determines whether a 4G LTE spectrum is available for use. It is envisaged that the SAS client 1908 may not perform such a determination in an alternative embodiment.

If there is no available 4G LTE spectrum, the SAS client 1908 then controls the transceiver 1990 to communicate with the SAS server 18 in order to determine whether or not the device 19 is permitted to use the CBRS spectrum. More specifically, the SAS client 1908 controls the transceiver 1990 to use the CBRS spectrum to transmit to the SAS server 18 a request for permission or authorization to use the CBRS spectrum.

While the transceiver 1990 is communicating with the SAS server 18, the SAS client 1908 repeatedly determines whether or not a cumulative use of the CBRS spectrum by the device 19 to communicate with the SAS server 18 satisfies a condition, until the SAS client 1908 determines that either (i) the cumulative use of the CBRS spectrum satisfies the condition or (ii) the device 19 is permitted to use the CBRS spectrum to transmit or receive data.

In order to determine whether or not the cumulative use of the CBRS spectrum satisfies the condition, the SAS client 1908 measures either directly or indirectly the amount of CBRS spectrum usage (that is, the amount of usage of the CBRS spectrum by the device 19 to determine whether or not the device 19 is permitted to use the CBRS spectrum). That is, the SAS client 1908 determines or measures either directly or indirectly use of the CBRS spectrum by the device 19 to transmit each request for permission or authorization to use the CBRS spectrum to transmit or receive data.

With respect to indirect measurement, the SAS client 1908 determines an expected immediate use of the CBRS spectrum based on the type of use of the CBRS spectrum the transceiver 1990 is expected to immediately use in order to make a request for permission or authorization. In this embodiment, the type of expected immediate use of the CBRS spectrum may be one or more of a group consisting of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission. With respect to direct measurement, the SAS client 1908 determines an expected immediate use of the CBRS spectrum, by making one or more directly measurements of the device 19. For example, the SAS client 1908 may measure a power amplifier state of the transceiver 1990 in an embodiment of the device 19.

Subsequently, based on the expected immediate use of the CBRS spectrum, the SAS client 1908 calculates a cumulative use or updates a previously calculated cumulative use of the CBRS spectrum by the device 19 to transmit one or more requests for permission or authorization to use the CBRS spectrum.

The cumulative or updated cumulative use of the CBRS spectrum is then compared to a threshold to determine whether or not the updated cumulative use exceeds the threshold. Depending on the embodiment, the threshold may be fixed or not fixed, for example, vary based on the period of time during which the cumulative use is calculated.

If or when the SAS client 1908 determines that the cumulative use of the CBRS spectrum by the device 19 to determine whether the device 19 is permitted to use the CBRS spectrum satisfies the condition, the SAS client 1908 controls the transceiver 1990 not to communicate with the SAS server 18 over the CBRS spectrum for a period of time.

In this embodiment of the device 19, the SAS client 1908 controls the transceiver 1990 to restart or resume communicating with the SAS server 18 over the CBRS spectrum after the period of time. However, it is envisaged that the SAS client 1908 may not do so in an alternative embodiment of the device 19. In such an alternative embodiment of the device 19, the SAS client 1908 may be configured to control the transceiver 1990 to again communicate with the SAS server based on a user input, for example, from the designated application 1903, or automatically based on a predetermined setting.

If or when a grant approval is received by the device 19 from the SAS server 18, the SAS client 1908 then determines that the device is permitted to use the CBRS spectrum.

Figure 3:
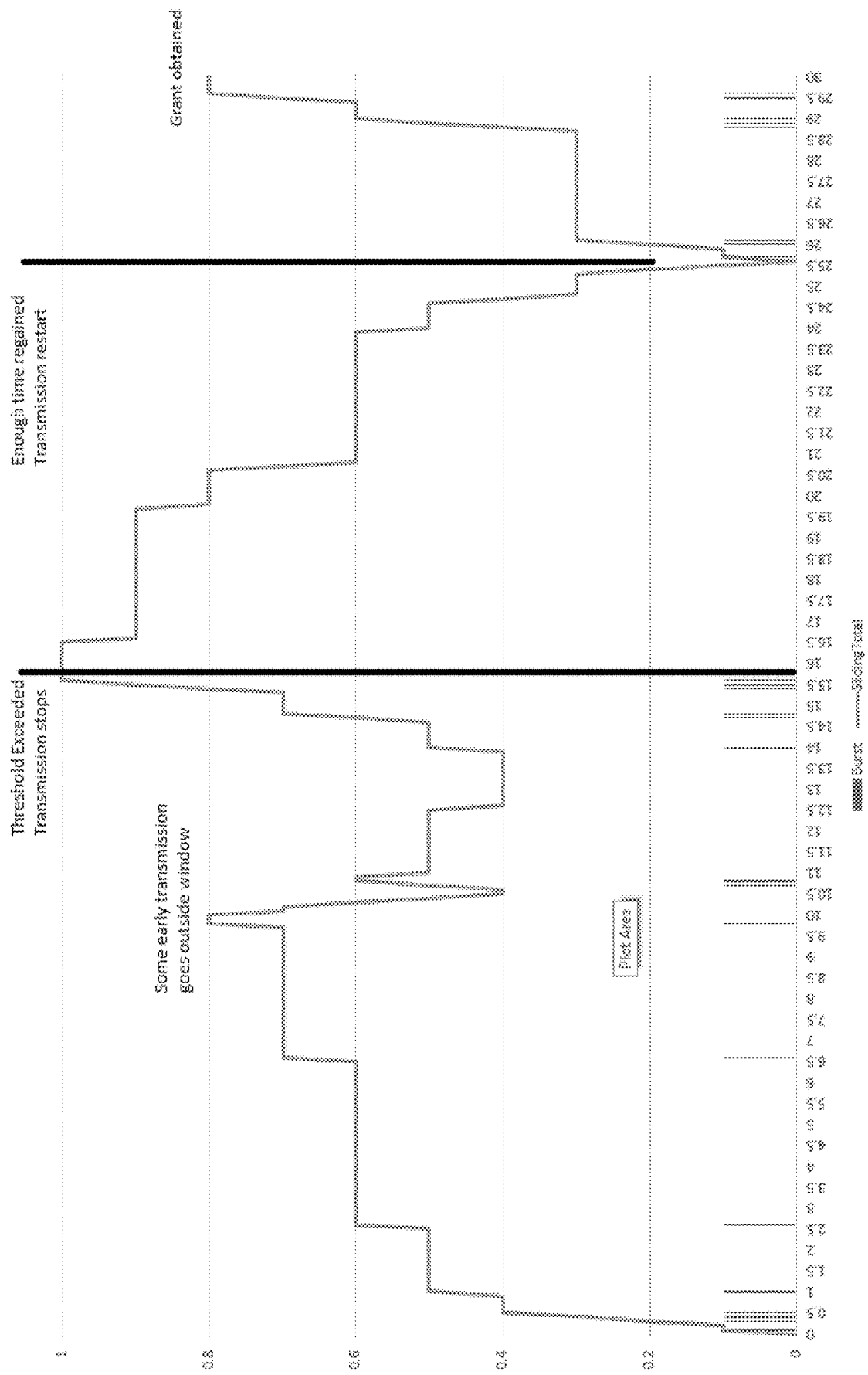
FIG. 3 is a schematic diagram illustrating an example of how an embodiment of the device 19 of FIGS. 1 and 2 may determine whether or not an updated cumulative use of the CBRS spectrum satisfies a condition.

FIG. 3 is a schematic diagram illustrating an example of how an embodiment of the device 19 of FIGS. 1 and 2 may determine whether or not an updated cumulative use of the CBRS spectrum by the device 19 is compared to a threshold to determine whether or not the updated cumulative use satisfies a condition.

As illustrated in FIG. 3, a sliding window diagram is used to illustrate how the device 19 determines whether or not an updated cumulative use of the CBRS spectrum by the device 19 (that is, an updated cumulative use of the CBRS spectrum by the device 19 when transmitting a request or requests for authorization or permission for use of the CBRS spectrum) for a period of time is compared to a threshold for the period of time to determine whether or not the updated cumulative use exceeds the threshold for the period of time.

In this example, the period of time on which the threshold is based is a 10-second "window" or time period. The threshold is 1 second. That is, the device 19 of this example determines whether or not use of the CBRS spectrum by the device 19 exceeds 1 second in any 10-second window. In the figure, use of the CBRS spectrum by the device 19 is indicated by blue coloured "bursts" of transmissions (that is, transmissions of requests for authorization or permissions to use the CBRS spectrum) along the horizontal axis and cumulative use of the CBRS spectrum is indicated by an orange coloured "Sliding Total" line. The left vertical black coloured line indicates that use of the CBRS spectrum exceeded 1 second in a 10-second window. The right vertical black coloured line indicates that the device 19 stopped using the CBRS spectrum for a 10-second window starting from the time use of the CBRS spectrum exceeded 1 second in a 10-second window.

It is envisaged that, in an alternative embodiment of the device 19, the device 19 may not be required to stop using the CBRS spectrum for a full 10-second window. That is, the device 19 may resume using the CBRS spectrum to transmit requests for authorization or permission beforehand.

Also, it is envisaged that other embodiments of the device 19 may involve different thresholds. For example, in an alternative embodiment, the device 19 may determine whether or not use of the CBRS spectrum by the device 19 exceeds 10 seconds in any 300-second period. In yet another embodiment, the device 19 may determine whether or not use of the CBRS spectrum by the device 19 exceeds 20 seconds in any 3600-second period.

Figure 4:
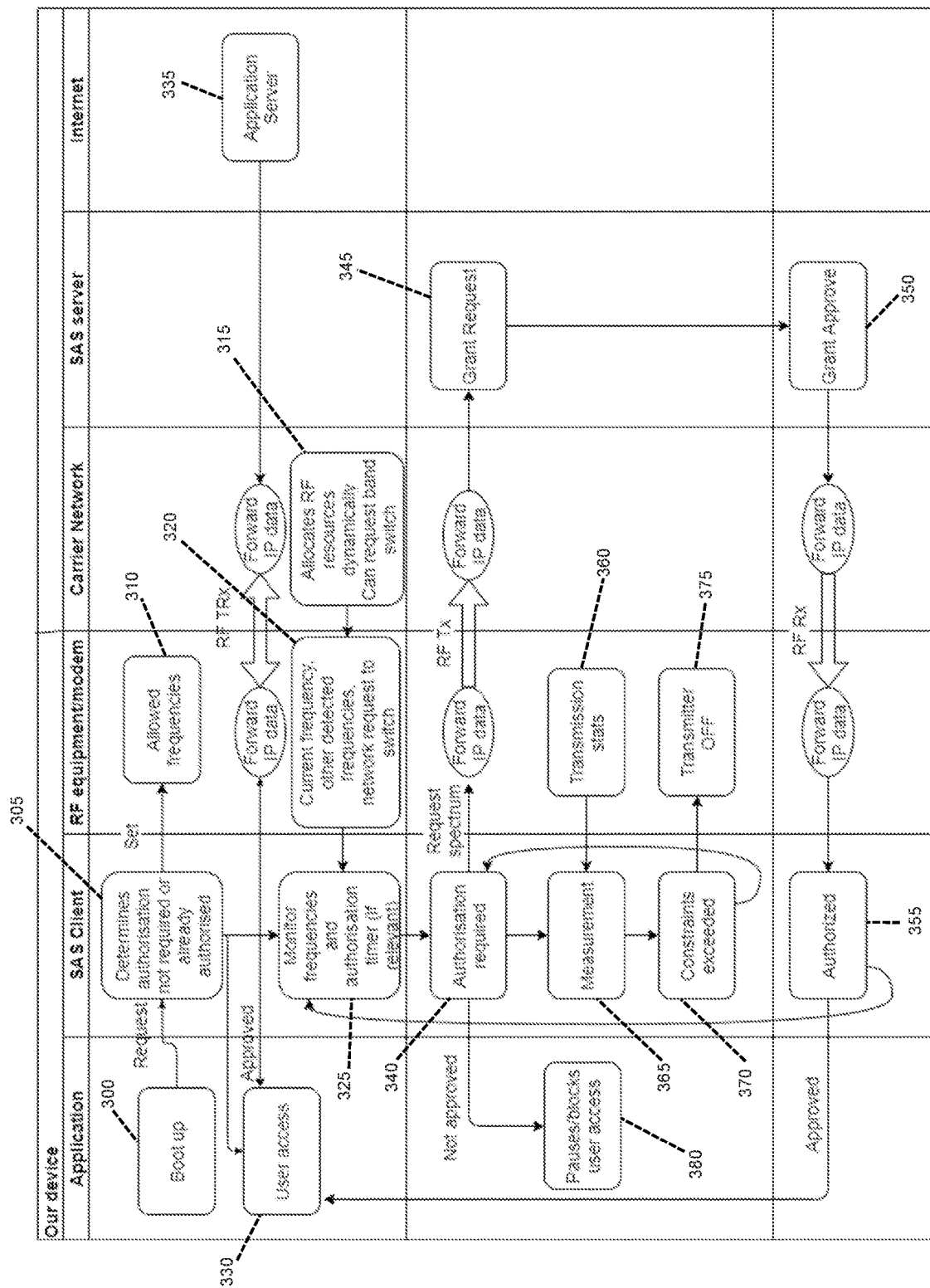
FIG. 4 is a flow chart of an embodiment of a method obtaining permission to use the CBRS spectrum to transmit or receive data, carried out using the system 10 of FIG. 1.

FIG. 4 is a flow chart of an embodiment of a method of obtaining permission to use the CBRS spectrum to transmit or receive data (such as Internet Protocol (IP) data), carried out using the device 19 of FIGS. 1, 2 and 3.

Firstly, the designated application 1903 installed on the device 19 is booted up at step 300. Then, the SAS client 1908 implemented by the device 19 is requested by the application 1903 to make a determination of whether or not the device 19 is required to obtain authorization for using the CBRS spectrum to transmit the data at step 305.

It is envisaged that the device 19 might not have to make any transmission, and so cause any radio interference when determining whether the device 19 is required to obtain authorization for using the CBRS spectrum to transmit the data at step 305. For example, the device 19 can carry out a receive-only scan of any frequency band or bands the device 19 is capable of accessing in order to look for any signal or signals that may provide a sufficiently reliable link over which the device 19 could request for access to the shared CBRS spectrum. Also, the device 19 can check if the device 19 has previously been authorized to use the CBRS spectrum and if any such authorization or authorizations are still valid.

In this embodiment, the SAS client 1908 can determine whether or not the device 19 is required to obtain authorization for using the CBRS spectrum, by looking for a 4G LTE base station (that is, an enhanced Node B (eNodeB)) which is broadcasting a carrier identifier (ID) (specifically, a public land mobile network ((PLMN)) that matches a user identity module (UIM) inserted into the device 19.

Thus, the device 19 does not need to obtain authorization if the device 19 is either already authorized to use the CBRS spectrum, or is able to control the RF equipment, modem or some other transceiver 1990 of the device 19 to use spectrum other than the CBRS spectrum, such as a 4G LTE frequency spectrum.

If the device 19 can use a 4G LTE frequency or frequencies instead of the CBRS spectrum, the SAS client sets the RF equipment, modem or some other transceiver 1990 to use the frequency or frequencies at step 310.

In this embodiment, the device 19 is already authorized to use the CBRS spectrum if the device 19 has previously received a grant approval from a SAS server 18. If the device 19 has previously received a grant approval from the SAS server 18, a user can use the application to control the RF equipment, modem and/or other components at step 330 to transmit the data via a carrier network to an application server which is connected via the Internet. At step 335, the application server can transmit data via the carrier network to the device 19 for display by the application. That is, the device 19 may not merely transmit but also receive data if the device 19 has previously received a grant approval from the SAS server 18.

If the device 19 is not already authorized to use the CBRS spectrum, the SAS client can monitor for any detected frequency or frequencies and if required, do so based on an authorization timer at step 325. As illustrated in step 320, the RF equipment, modem and/or or some other transceiver 1990 can be used to detect a current frequency and make a request to switch to another frequency if other frequencies allocated by the carrier network are detected by the RF equipment, modem and/or or some other transceiver 1990. Such RF resources can be dynamically allocated by a carrier network which can also make a request to switch to a different frequency band or bands at step 315.

Using the detected frequency or frequencies detected by the device 19 at step 325, the SAS client 1908 controls the RF equipment, modem and/or some other transceiver 1990 of the device 19 to communicate with the SAS server 18 over the CBRS spectrum in order to determine whether or not the device 19 is permitted to use the CBRS spectrum. In particular, the SAS client 1908 can control the RF equipment, modem and/or some other transceiver 1990 to make a request for grant to use of the CBRS spectrum at step 340, for example, by way of a LTE attach procedure, over the shared CBRS spectrum. Upon receiving the grant request at step 345, the SAS server 18 may approve the request and transmit to the device 19 an approval to grant the device 19 to use the CBRS spectrum at step 350. Upon receiving the grant approval, the device 19 has obtained authorization of and accordingly is permitted to use the CBRS spectrum at step 355.

The device 19 can configure itself in order to minimize the amount of data that is transmitted over the CBRS spectrum, before the SAS client 18 controls the RF equipment, modem and/or some other transceiver 1990 to make a request for grant to use of the CBRS spectrum at step 340. For example, the device 19 can configure itself such that user transmissions are blocked and that only transmissions required to obtain permission or authorization to use the CBRS spectrum are made.

As illustrated in the figure, the device 19 may continue to monitor for any detected frequency or frequencies and if required, do so based on an authorization timer even after the device 19 has obtained authorization of and accordingly is permitted to use the CBRS spectrum at step 355.

While the transceiver 1990 of the device 19 is communicating with the SAS server over the CBRS spectrum to determine whether or not the device 19 is permitted to use the CBRS spectrum, the SAS client 1908 can repeatedly determine whether or not a cumulative use of the CBRS spectrum by the device 19 to communicate with the SAS server satisfies a condition until the device 19 determines that either (i) the cumulative use of the CBRS spectrum satisfies the condition or (ii) the device 19 is permitted to use the CBRS spectrum.

In this embodiment, the SAS client 19 determines whether or not a cumulative use of the CBRS spectrum by the device 19 to communicate with the SAS server 18 satisfies a condition, by performing a number of indirect measurement steps. Before performing these indirect measurement steps, the device 19 can generate a table of types of transmissions the device 19 expects to make in order to gain authorization and a value for the amount of time the device 19 expects to use the CBRS spectrum (for example, based on a transmitter of the device 19 is expected to be on) for each type of transmission. If a transmission of a type can have varying amount of time of usage, the value may be a worst-case figure (for example, the maximum amount of time the device 19 is expected to use the CBRS spectrum) for that type of transmission.

A person skilled in the art will appreciate that RF protocols typically use different types of transmissions for different purposes or phases in communications and typically these transmission types have very different characteristics in terms of interference potential to other devices. An example of the table of types of transmissions is set out below in table 1:

TABLE 1

| Transmission type | Worst case time |
|---|---|
| PUSCH | 1 ms |
| PUCCH | 1 ms |
| SRS | 83 μs |
| PRACH | 2.284 ms |

One advantage of tracking different types of transmissions independently is that any variance between the calculation (that is, the expected immediate use of the CBRS spectrum) that is based on the worst-case figure and the true value is greatly reduced. In this respect, it is envisaged that such variance can be made arbitrarily low by adding additional sub types as needed.

At step 365, the SAS client 1908 determines an expected immediate use of the CBRS spectrum, and then calculates a cumulative or updates a previously calculated cumulative use of the CBRS spectrum using or based on the determined expected use.

Specifically, the SAS client 1908 uses statistics on one or more expected transmissions on the CBRS spectrum by the RF equipment, modem or some other transceiver 1990 at step 360 to estimate an expected immediate use of the CBRS spectrum by the device 19 to perform the expected transmission based on the type of the expected transmission. With the table of types of transmissions above, the device 19 can just monitor the number of transmissions of each type and then multiply each by the table factor to get the total amount of time the device 19 is expected to use the CBRS spectrum.

Then, the SAS client 1908 calculates a cumulative use of the CBRS spectrum or updates a previously calculated cumulative use of the CBRS spectrum using or based on the determined expected use. In this embodiment, the SAS client 1908 uses an accumulator to keep track of the amount of time the device 19 uses the CBRS spectrum. Depending on the implementation of the device 19, the cumulative or updated cumulative may be an average value over a period of time. In this embodiment, when the accumulator reaches one second, 1 second is subtracted and real time is recorded in a list. Then, each time an entry is added to the list, the device 19 can check if the most recent entries in the list would violate any constraints and remove the oldest entries if outside the longest time window.

Depending on the implementation, as an alternative to the above indirect measurement steps 360, 365, the device 19 may perform direct measurement steps, that is, steps to directly measure any transmissions required to obtain permission or authorization to use the CBRS spectrum. Before performing such direct measurement steps, the device 19 may configure itself to perform such direct measurement steps. For example, the device 19 may configure itself such that the device 19 can measure the length of each burst of transmission that is made to obtain permission or authorization by looking at power amplifier state. It is envisaged that this measurement does not have to be exact and may be a worst-case figure. In this respect, a person skilled in the art will appreciate that any step or steps taken to get improve the accuracy of such a worst-case figure will likely be advantageous, in particular, enable the device 19 to make longer transmissions and have a greater probability of establishing a grant before any authorization timer expires.

At step 370, the SAS client 1908 compares the cumulative or updated cumulative use to a threshold to determine whether or not the cumulative or the updated cumulative use exceeds the threshold. Specifically, the device 19 determines whether one or more constraints are exceeded. It is envisaged that any such constraint which the device 19 needs to meet before grant depends on which system is in use for that spectrum. For example, one constraint may be that the device 19 has less than X seconds of transmission at above power level Y in the last Z seconds.

If the threshold or constraints are exceeded, the SAS client 1908 determines that use of the CBRS spectrum by the device 19 to communicate with the SAS server satisfies the condition, and the RF equipment, modem or some other transceiver 1990 of the device 19 is controlled to stop communicating with the SAS server 18 over the CBRS spectrum at step 375. In this embodiment, the device 19 can be controlled to temporarily stop communicating for only a period of time by turning off the RF equipment, modem or some other transceiver 1990. Alternatively, the device 19 can also pause on monitoring for any detected frequency or frequencies at step 380 during which the user is blocked from using the CBRS spectrum.

As indicated above, the device 19 is configured to track real usage and stop transmission just before limits are reached. This is advantageous in that a specific pattern of transmissions for obtaining authorization need not be pre-set or known. For example, in an 4G LTE embodiment, time and frequency allocations are determined not by individual devices but by dynamic network allocations and hence re-transmissions may be required. In such an embodiment, network configuration can thus have a large impact on the transmission duty cycle of the device 19.

It is envisaged that the time required to obtain authorization for the CBRS spectrum depends on many factors and most of these factors are not within control of the device 19. Therefore, the device 19 is configured to conserve transmission so that there is as much real time as possible to receive an acknowledge grant before the communication must be shut down. Depending on the embodiment, the device 19 may not be completely silent (as this is not allowed in some radio protocols) but may be configured to use only short bursts in a low duty cycle configuration.

Further aspects of the method will be apparent from the above description of the system. For example, it will be appreciated that the SAS client 1908 implemented by the device 19 may alternatively be separate device to the device implementing the designated application 1903. Persons skilled in the art will also appreciate that the method of FIG. 4 could be embodied in program code. The program code could be supplied in a number of ways, for example on a tangible computer readable medium, such as a disc or a memory (for example, that could replace part of memory) or as a data signal (for example, by transmitting it from a server).

Similarly, it will be appreciated that the data such as the table of types of transmissions for obtaining authorization or permission to use the CBRS spectrum can be supplied on any appropriate tangible data carrier, such as by writing them to a portable device (such as a USB drive), storing them in a memory (including transmitting the data to a device having a memory) etc.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments of the invention.

Further, any reference made herein to prior art is not intended to imply that such prior art forms or formed a part of the common general knowledge in Australia or any other country.

The invention claimed is:

1. A method of obtaining permission to use a Radio Frequency (RF) resource to transmit or receive data, the method comprising:
controlling a device to communicate with a RF resource allocation system over the RF resource in order to determine whether or not the device is permitted to use the RF resource;
while communicating with the RF resource allocation system over the RF resource, repeatedly determining whether or not a cumulative use of the RF resource by the device to communicate with the RF resource allocation system satisfies a condition until there is a determination that either (i) the cumulative use of the RF resource satisfies the condition or (ii) the device is permitted to use the RF resource; upon a determination that the cumulative use of the RF resource satisfies the condition, controlling the device to not communicate with the RF resource allocation system over the RF resource for a period of time; and
upon a determination that the device is permitted to use the RF resource, controlling the device to use the RF resource to transmit or receive the data;
wherein the RF resource allocation system is a Federal Communications Commission (FCC) Spectrum Access System (SAS).

2. A method as claimed in claim 1, wherein the RF resource is an unlicensed Citizen Broadband Radio Service (CBRS) spectrum.

3. A method as claimed in claim 1, wherein the device is a $4^{th}$ Generation (4G) Long Term Evolution (LTE) device.

4. A method as claimed in claim 1, wherein controlling the device to communicate with the RF resource allocation system over the RF resource comprises controlling the device to transmit a request to a SAS server.

5. A method as claimed in claim 1, further comprising determining that the device is permitted to use the RF resource after receiving a grant approval from a SAS server.

6. A method as claimed in claim 1, wherein determining whether or not the cumulative use of the RF resource satisfies the condition comprises:
determining an expected immediate use of the RF resource;
calculated an updated cumulative use of the RF resource based on the expected immediate use of the RF resource; and
comparing the updated cumulative use of the RF resource to a threshold to determine whether or not the updated cumulative use exceeds the threshold.

7. A method as claimed in claim 6, wherein the expected immediate use of the RF resource is determined based on a type of the expected immediate use of the RF resource.

8. A method as claimed in claim 7, wherein the type of the expected immediate use of the RF resource is one or more of a group consisting of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission.

9. A method as claimed in claim 6, wherein the updated cumulative use of the RF resource is calculated for a period of time, and
wherein determining whether or not the cumulative use of the RF resource satisfies the condition comprises determining the threshold based on the period of time for which the updated cumulative use of the RF resource is calculated.

10. A method as claimed in claim 1, further comprising:
determining whether or not another RF spectrum is available for use before controlling the device to communicate with the RF resource allocation system over the RF resource; and
controlling the device to communicate with the RF resource allocation system over the RF resource, upon determining that the other RF spectrum is not available for use.

11. A device for obtaining permission to use a Radio Frequency (RF) resource to transmit or receive data, the device comprising:
a transceiver, and
a processor configured to:
control the transceiver to communicate with a RF resource allocation system over the RF resource in order to determine whether or not the device is permitted to use the RF resource; while the transceiver is communicating with the RF resource allocation system over the RF resource, repeatedly determine whether or not a cumulative use of the RF resource by the device to communicate with the RF resource allocation system satisfies a condition until the processor determines that either (i) the cumulative use of the RF resource satisfies the condition or (ii) the device is permitted to use the RF resource;

upon the processor determining that the cumulative use of the RF resource satisfies the condition, control the transceiver to not communicate with the RF resource allocation system over the RF resource for a period of time; and upon the processor determining that the device is permitted to use the RF resource, control the device to use the RF resource to transmit or receive the data;

wherein the RF resource allocation system is a Federal Communications Commission (FCC) Spectrum Access System (SAS).

12. A device as claimed in claim 11, wherein the RF resource is an unlicensed Citizen's Broadband Radio Service (CBRS) spectrum.

13. A device as claimed in claim 11, wherein the device is a 4$^{th}$ Generation (4G) Long Term Evolution (LTE) device.

14. A device as claimed in claim 11, wherein the processor is configured to control the transceiver to transmit a request to a SAS server.

15. A device as claimed in claim 11, wherein the processor is configured to determine that the device is permitted to use the RF resource after receiving a grant approval from a SAS server.

16. A device as claimed in claim 11, wherein the processor is further configured to:

determine an expected immediate use of the RF resource;

calculate an updated cumulative use of the RF resource based on the expected immediate use of the RF resource; and compare the updated cumulative use of the RF resource to a threshold to determine whether or not the updated cumulative use exceeds the threshold.

17. A device as claimed in claim 16, wherein the processor is configured to determine the expected immediate use of the RF resource based on a type of the expected immediate use of the RF resource.

18. A device as claimed in claim 17, wherein the type of the expected immediate use of the RF resource is one or more of a group consisting of: a Physical Uplink Shared Channel (PUSCH) transmission, a Physical Uplink Control Channel (PUCCH) transmission, a Sounding Reference Signal (SRS) transmission, and a Physical Random Access Channel (PRACH) transmission.

19. A device as claimed in claim 16, wherein the processor is further configured to:

calculate the updated cumulative use of the RF resource for a period of time; and determine the threshold based on the period of time for which the updated cumulative use of the RF resource is calculated.

20. A device as claimed in claim 11, wherein the processor is further configured to:

determine whether or not another RF spectrum is available for use before controlling the transceiver to communicate with the RF resource allocation system over the RF resource; and controlling the transceiver to communicate with the RF resource allocation system over the RF resource, upon determining that the other RF spectrum is not available for use.

* * * * *